No. 607,555.  
L. SUTRO.  
CORDED SKIRT FACING.  
(Application filed Dec. 20, 1895.)  
Patented July 19, 1898.

(No Model.)

Witnesses:  
Raphaël Netter  
Hugh Reid Griffin

Ludwig Sutro  
Inventor  
by Walter K. Griffin Att'y.

UNITED STATES PATENT OFFICE.

LUDWIG SUTRO, OF NEW YORK, N. Y.

CORDED SKIRT-FACING.

SPECIFICATION forming part of Letters Patent No. 607,555, dated July 19, 1898.

Application filed December 20, 1895. Serial No. 572,742. (No specimens.)

*To all whom it may concern:*

Be it known that I, LUDWIG SUTRO, a citizen of the United States, and a resident of the city of New York, State of New York, have invented a new and useful Improvement in Corded Skirt-Facings, of which the following is a specification.

My invention has for its object to obviate certain objections to the use of the present skirt-facings, such as are commonly used to protect the lower edge of women's skirts from wear.

Figure 1:
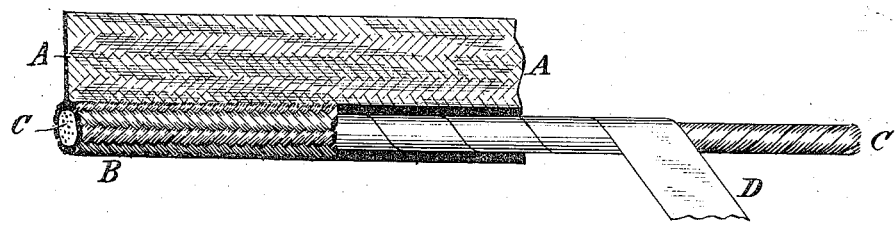
Figure 2:
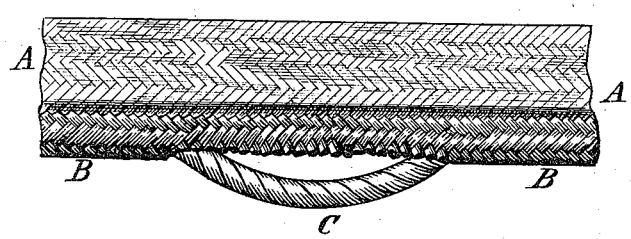

Figure 1 of the accompanying drawings shows my improved facing, and Fig. 2 shows the ordinary facing as now used and makes more clear the object of my invention.

The present facing consists of a flat braided tape A A, the lower edge or bead of which, B B, is woven round a rope-like core C C, so as to give a round edge much thicker than the tape A A and generally sufficient in thickness to project slightly beyond the substance of the skirt to which the facing is to be attached. In wear so soon as the bead B B is frayed or worn through the core C C tends to drop down and to sag, as shown in Fig. 2, and if caught in the heel or in any obstruction the core is drawn out and tends to trip the wearer.

In my invention I make use of a core which is rendered waterproof and adhesive, so that when woven into the braid or facing the strands of the bead B B adhere to the core, and even if these strands are worn completely through there is yet sufficient adhesion in the neighboring unworn parts still to keep the core in place. The waterproofing of the core C C also tends to prevent rotting and aids the quick drying of the braid after being wetted in wear.

One method of waterproofing the core is shown in Fig. 1, where a stiff sheet of gutta-percha D is wound spirally round the core, the core and gutta-percha sheathing woven into the braid, and the whole then heated or treated in any of the usual methods, so as to become sufficiently adhesive; or the core C C may be coated with any waterproofing adhesive solution, as is common in waterproof textile materials, and woven into the facing while adhesive; but I prefer the gutta-percha.

What I claim as my invention, and wish to secure by Letters Patent, is—

1. A beaded skirt-facing of braided material having a waterproof adhesive core in the edge bead, substantially as described.

2. In a beaded skirt-facing of braided material, the tape A A, the bead B B and the core C C, coated with a waterproof adhesive substance uniting the strands of the bead B B to the core C C, substantially as and for the purposes described.

3. In a beaded skirt-facing of braided material, a core C C sheathed in adhesive gutta-percha uniting the strands of the bead B B and the core C C, substantially as and for the purposes described.

In testimony that I claim the foregoing as my invention I have signed my name, in presence of two witnesses, this 3d day of December, 1895.

LUDWIG SUTRO.

Witnesses:
WALTER K. GRIFFIN,
HERMAN BOWSKY.